US010552612B2

(12) United States Patent
Rodniansky

(10) Patent No.: US 10,552,612 B2
(45) **Date of Patent: *Feb. 4, 2020**

(54) RESOURCE USAGE OPTIMIZED AUDITING OF DATABASE SHARED MEMORY

(71) Applicant: International Business Machines Corporation, Armonk, NY (US)

(72) Inventor: Leonid Rodniansky, Allston, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,867

(22) Filed: Aug. 29, 2018

(65) Prior Publication Data

US 2019/0012462 A1 Jan. 10, 2019

Related U.S. Application Data

(63) Continuation of application No. 14/534,248, filed on Nov. 6, 2014, now Pat. No. 10,127,383, which is a (Continued)

(51) Int. Cl.
*G06F 21/57* (2013.01)
*H04L 29/06* (2006.01)

(52) U.S. Cl.
CPC ........ *G06F 21/57* (2013.01); *G06F 2221/034* (2013.01); *G06F 2221/2101* (2013.01); *H04L 63/20* (2013.01)

(58) Field of Classification Search
CPC ............... G06F 21/57; G06F 2221/034; G06F 2221/2101; H04L 63/20
See application file for complete search history.

(56) References Cited

U.S. PATENT DOCUMENTS 6,971,028 B1 * 11/2005 Lyle ...................... G06F 21/554 709/224
7,970,788 B2 * 6/2011 Ben-Natan .......... G06F 21/6227 707/782

(Continued)

OTHER PUBLICATIONS

Ruzhi et al., "A Database Security Gateway to the Detection of SQL Attacks", Aug. 20, 2010, 2010 3rd International Conference on Advanced Computer Theory and Engineering (ICACTE), 4 pages total.*

(Continued)

*Primary Examiner* — Todd L Barker
(74) *Attorney, Agent, or Firm* — Garg Law Firm, PLLC; Rakesh Garg; David Woycechowsky

(57) ABSTRACT

A method for security auditing of database transactions is provided in the illustrative embodiments. For a specified period, an available capacity of a computing resource in a data processing system usable to analyze a database protocol packet. The database protocol packet is stored in a shared memory during a data communication. A number of database protocol packets expected in the shared memory during the specified period is determined. Determining a second number of database protocol packets that can be analyzed using the available capacity of the computing resource is computed. During the specified period, the second number of database protocol packets is caused to be selected from every number of database protocol packets stored in the shared memory for analysis using the computing resource during the specified period.

9 Claims, 5 Drawing Sheets

Related U.S. Application Data continuation of application No. 14/837,076, filed on Aug. 27, 2015, now Pat. No. 10,108,799, which is a continuation of application No. 16/115,803, filed on Aug. 29, 2018.

(56) References Cited

U.S. PATENT DOCUMENTS

| | | | | |
|---|---|---|---|---|
| 8,447,851 | B1 * | 5/2013 | Anderson | G06F 11/3006 709/223 |
| 9,038,151 | B1 * | 5/2015 | Chua | H04L 45/02 709/223 |
| 2007/0223437 | A1 * | 9/2007 | Virgile | H04L 63/0892 370/338 |
| 2012/0239652 | A1 * | 9/2012 | Wood | G06F 16/285 707/737 |
| 2013/0003546 | A1 * | 1/2013 | Matthews | H04L 43/0894 370/231 |
| 2014/0201838 | A1 * | 7/2014 | Varsanyi | G06F 21/552 726/23 |
| 2014/0229945 | A1 * | 8/2014 | Barkai | H04L 49/70 718/1 |
| 2014/0280894 | A1 * | 9/2014 | Reynolds | H04L 43/0876 709/224 |
| 2015/0207717 | A1 * | 7/2015 | Djukic | H04L 41/082 709/221 |
| 2015/0271102 | A1 * | 9/2015 | Antich | H04L 47/825 370/230 |

OTHER PUBLICATIONS

List of IBM related patents, Appendix P, 2018.

* cited by examiner

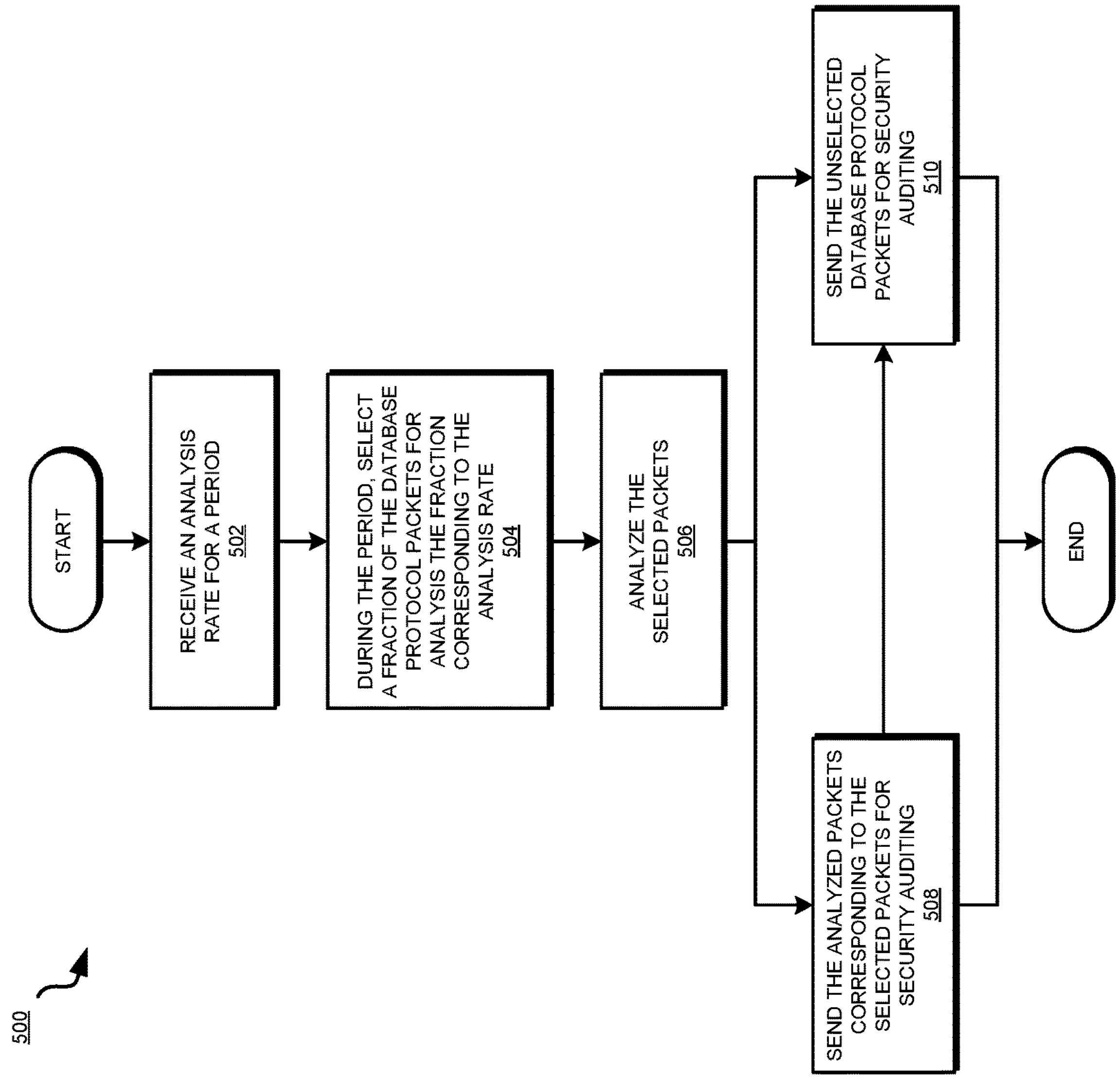
FIG. 5
500
START
RECEIVE AN ANALYSIS RATE FOR A PERIOD 502
DURING THE PERIOD, SELECT A FRACTION OF THE DATABASE PROTOCOL PACKETS FOR ANALYSIS THE FRACTION CORRESPONDING TO THE ANALYSIS RATE 504
ANALYZE THE SELECTED PACKETS 506
SEND THE ANALYZED PACKETS CORRESPONDING TO THE SELECTED PACKETS FOR SECURITY AUDITING 508
SEND THE UNSELECTED DATABASE PROTOCOL PACKETS FOR SECURITY AUDITING 510
END

RESOURCE USAGE OPTIMIZED AUDITING OF DATABASE SHARED MEMORY

TECHNICAL FIELD

The present invention relates generally to a method for ensuring security compliance of database transactions. More particularly, the present invention relates to a method for resource usage optimized auditing of database shared memory.

BACKGROUND

Shared memory is an area of a memory that is accessible to all entities participating in a data communication, for facilitating the data communication between those entities. Simply stated, one entity writes data to the shared memory for the other entity to read. Using shared memory avoids or minimizes the need for data replication from system to system or memory to memory for the purposes of communicating that data from one entity to another.

Shared memory is a commonly used method for efficient database transactions between a database server and a database client. For example, in response to a query from a database client, a database server writes data packets to the shared memory. The database client reads the data packet from the shared memory. A database client can similarly write the query to the shared memory and the database server reads the query from the shared memory to execute against the database.

The data packets written to the shared memory that is used by a database server and a database client are constructed according to a suitable database protocol employed by the database implementation. Accordingly, the data packets are database protocol packets.

SUMMARY

The illustrative embodiments provide a method for resource usage optimized auditing of database shared memory. An embodiment includes a method for security auditing of database transactions. The embodiment forecasts, in a data processing system, for a specified period, an available capacity of a computing resource in the data processing system, the available capacity being usable to analyze a database protocol packet, wherein the database protocol packet is stored in a shared memory during a data communication. The embodiment determines a number of database protocol packets expected in the shared memory during the specified period. The embodiment determines a second number of database protocol packets that can be analyzed using the available capacity of the computing resource. The embodiment causes, during the specified period, the second number of database protocol packets to be selected from every number of database protocol packets stored in the shared memory, the selected database protocol packets being analyzed using the computing resource during the specified period.

Another embodiment includes a computer usable program product comprising a computer readable storage device including computer usable code for security auditing of database transactions. Another embodiment includes a data processing system for security auditing of database transactions. The embodiment further includes a storage device, wherein the storage device stores computer usable program code. The embodiment further includes a processor, wherein the processor executes the computer usable program code.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 5 depicts a flowchart of another portion of an example process for resource usage optimized auditing of database shared memory in accordance with an illustrative embodiment.

DETAILED DESCRIPTION

Figure 1:
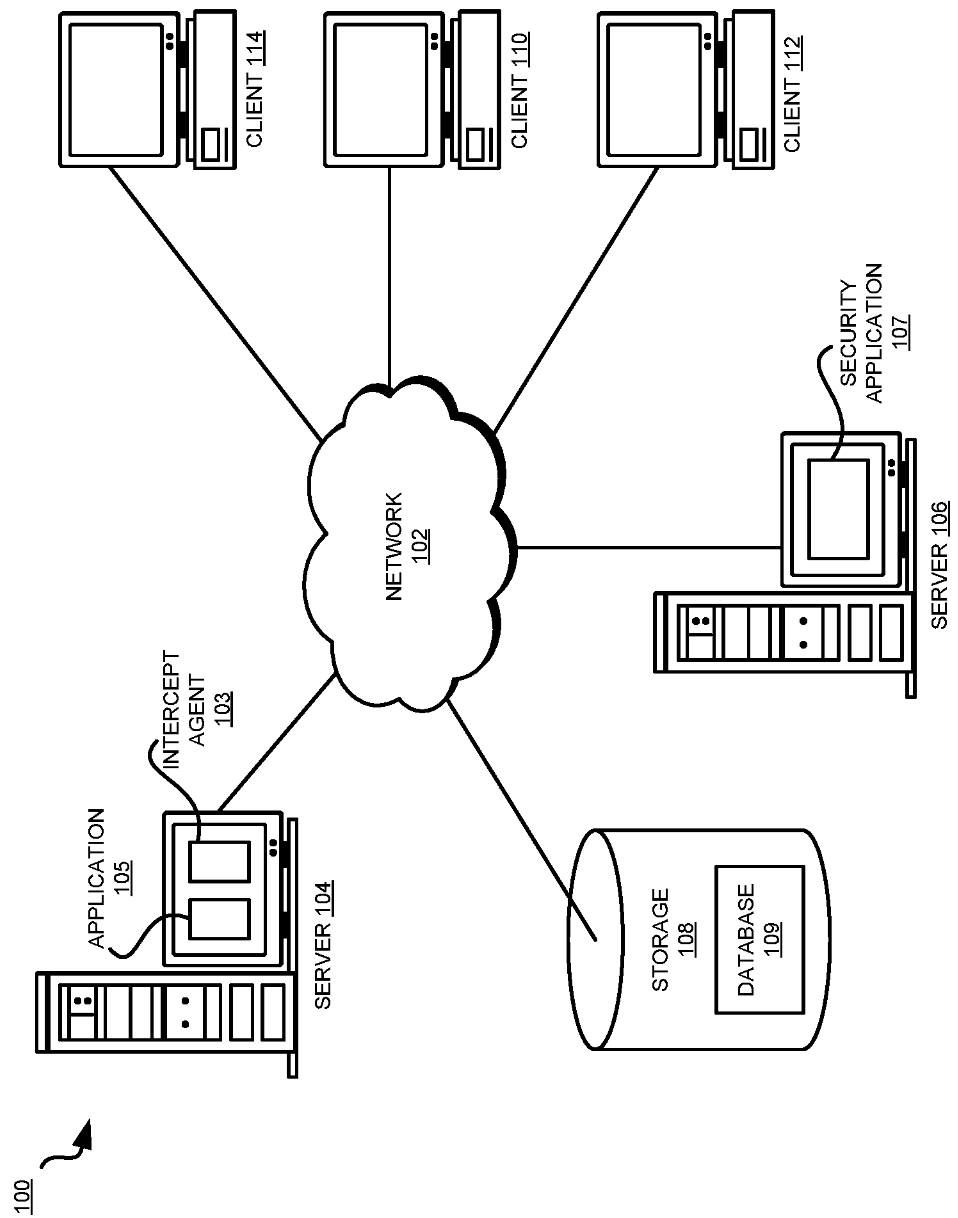
FIG. 1 depicts a block diagram of a network of data processing systems in which illustrative embodiments may be implemented.

Databases can include information that can be sensitive, protected, or otherwise subject to restricted access. Such information is collectively referred to as restricted data. Therefore, database transactions are often governed by one or more security policies to ensure that those transactions are in compliance with the rules, restrictions, limitations, or conditions of one or more security policies governing the restricted data.

Accordingly, determining whether the shared memory data, which is being exchanged between a database server and a database client, complies with one or more security policies is important. An intercept agent is an application or a component of the database server. The intercept agent intercepts, receives, or otherwise has access to the data packets written or stored in the shared memory.

The intercept agent sends the data packets that are present in the shared memory to a security application. The security application has access to one or more security policies governing the restricted data in the database. The security application examines each data packet received from the intercept agent for compliance with one or more security policies.

The illustrative embodiments recognize that an intercept agent executes at the data processing system that hosts a shared memory. Often, that data processing system operates as the database server or executes a database server application. The illustrative embodiments further recognize that the security application typically executes in a data processing system that is different from the data processing system where the intercept agent executes.

The illustrative embodiments recognize that analyzing the database protocol packets for security compliance is a computationally intensive task. Transforming data from one character set to another is one example step in the database protocol packet analysis that consumes computing resources. Subjecting the transformed data to the logic of one or more security policies is another example step in the database protocol packet analysis that consumes computing resources.

In some cases, the database protocol packet analysis has to be performed using several security policies in an iterative manner, serial manner, parallel manner, conditional manner, or subject to other logic. Such manners of database protocol packet analysis further exacerbate the consumption of computing resources, such as the central processing units of the data processing system where the security application is executing. A central processing unit is also interchangeably referred-to herein as a CPU, a processor, or a core. The data processing system where the security application is executing is referred-to herein as a security data processing system.

For these and other reasons, the resources at the security data processing system often experience heavy utilization from database protocol packet analysis. Overutilization of the computing resources at the security data processing system can result in loss of information and possible security breach.

The illustrative embodiments used to describe the invention generally address and solve the above-described problems and other problems related to analyzing database protocol packet for security compliance. The illustrative embodiments provide a method for resource usage optimized auditing of database shared memory.

The illustrative embodiments recognize that often spare processor capacity is available at the data processing system where the intercept agent executes, e.g., at the database server data processing system. The illustrative embodiments further recognize that the database server data processing system have limits or thresholds on resource utilization, such as processor usage, beyond which an application executing on the database server data processing system cannot use the corresponding resource. For example, an intercept agent is not allowed to use more than a threshold amount of processor cores available to the intercept agent at a database server data processing system.

For example, the database server data processing system may be a sixty-four core system, of which an intercept agent is limited to using twenty or less percent of eight or less cores. As another example, an intercept agent may be limited to using one or more of the sixty-four cores so long as the total utilization of those cores by the database server and the intercept agent does not exceed seventy percent. Such thresholds are configured in the database server data processing system to ensure that the database server itself is not starved for those resources given the expected load on the database server.

An embodiment, implemented as a load regulator application reduces the utilization of a computing resource on the security data processing system by partially pre-analyzing some database protocol packets at the database server data processing system. The security application therefore receives some database protocol packets as they are stored in the shared memory, and some database protocol packets in a partially pre-analyzed form, as opposed to receiving all database protocol packets as they are stored in the shared memory. A database protocol packet in a partially pre-analyzed form is referred to herein as an analyzed packet. The larger the ratio of analyzed packets versus database protocol packets, the larger the reduction in the utilization of the computing resources at the security data processing system.

For the remainder of the disclosure, the descriptions of the various embodiments will use the processor as an example computing resource, and processor utilization as an example measure of the resource usage. Such descriptions and references to the processor are not intended to be limiting on the illustrative embodiments. From this disclosure, those of ordinary skill in the art will be able to adapt an embodiment for more than one processor, other types of computing resources such as memory, and usage factors and thresholds corresponding thereto. Such adaptations are contemplated within the scope of the illustrative embodiments.

Assume that x number of database protocol packets are expected to be intercepted from the shared memory for security compliance for a specified future period. In order to create the analyzed packets in that future period, an embodiment predicts or forecasts the processor capacity that is expected to be available for use by the intercept agent during that future period. For example, one embodiment uses historical data about processor utilization over past periods to forecast a total expected processor utilization during the future period. Given the forecasted total expected processor utilization during the future period, and using a processor utilization threshold set for the intercept agent, the embodiment determines a total amount of processor capacity that is expected to be available for use by the intercept agent during that future period. The total amount of processor capacity that is expected to be available for use by the intercept agent during that future period is referred-to herein as future available processor capacity.

At least a part of this future available processor capacity is going to be used for certain functions that the intercept agent must perform without performing any database protocol packet analysis. A function that the intercept agent must perform without performing any database protocol packet analysis is referred-to herein as an essential function. An embodiment reduces the future available processor capacity by this amount, resulting in future available processor capacity for analyzing database protocol packets. Future available processor capacity for analyzing database protocol packets is referred-to herein as "future available processor capacity for analysis".

An embodiment receives feedback from the intercept agent about the amount of processor capacity used for performing the essential functions. The embodiment uses historical records of such amounts from such feedbacks in computing the future available processor capacity for performing the partial pre-analysis. The partial pre-analysis is also interchangeably referred-to hereinafter as "pre-analysis," "analysis," or other grammatical form thereof.

Furthermore, an embodiment receives as feedback from the intercept agent measurements of processor capacity used for performing the analysis of various database protocol packets. Using historical records of such measurements, the embodiment determines an expected amount of processor capacity that would be used to analyze a database protocol packet during the future period.

Given the future available processor capacity for analysis, and the expected amount of processor capacity that would be used to analyze a database protocol packet during the future period, an embodiment computes a number of database protocol packets that can be analyzed at the database server data processing system during the future period (y). Using the y number of database protocol packets that can be analyzed at the database server data processing system during the future period, and the x number of database protocol packets that are expected to exist in the shared memory during the future period, an embodiment computes a ratio. The ratio (y/x) represents the fraction of database protocol packets that can be analyzed at the database server data processing system, and whose resulting analyzed packets will be sent to the security application for security compliance checking during the future period. The ratio (1−y/x) represents that fraction of database protocol packets that are forwarded to the security application as-is for analysis as well as compliance checking during the future period.

An embodiment further enables an existing intercept agent to select database protocol packets from the shared memory according to the ratio. The embodiment causes the intercept agent to partially pre-analyze the selected database protocol packets, and send the corresponding analyzed packets to the security application. The embodiment causes the intercept agent to continue forwarding the unselected database protocol packets to the security application as those database protocol packets exist in the shared memory. Any suitable implementation of database protocol analyzer can be used for performing the partial pre-analysis on the selected packets within the scope of the illustrative embodiments.

A method of an embodiment described herein, when implemented to execute on a data processing system, comprises substantial advancement of the functionality of that data processing system in providing database services. For example, an embodiment enables calculated or forecasted usage of the database server data processing system's resources to offload certain computational work from the security data processing system, such that neither the performance of the database server is adversely affected, nor the security compliance computations are compromised. Such offloading based on calculated or forecasted usage and the resulting improvement in the security data processing system performance is unavailable in presently operating security data processing systems. Thus, a substantial advancement of such security data processing systems by executing a method of an embodiment comprises the prevention or mitigation of the errors, costs, and delays in security auditing of shared memory data.

The illustrative embodiments are described with respect to certain resources, usage values, ratios, analyses, protocols, packet structures, memories, databases, repositories, policies, logic, rules, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
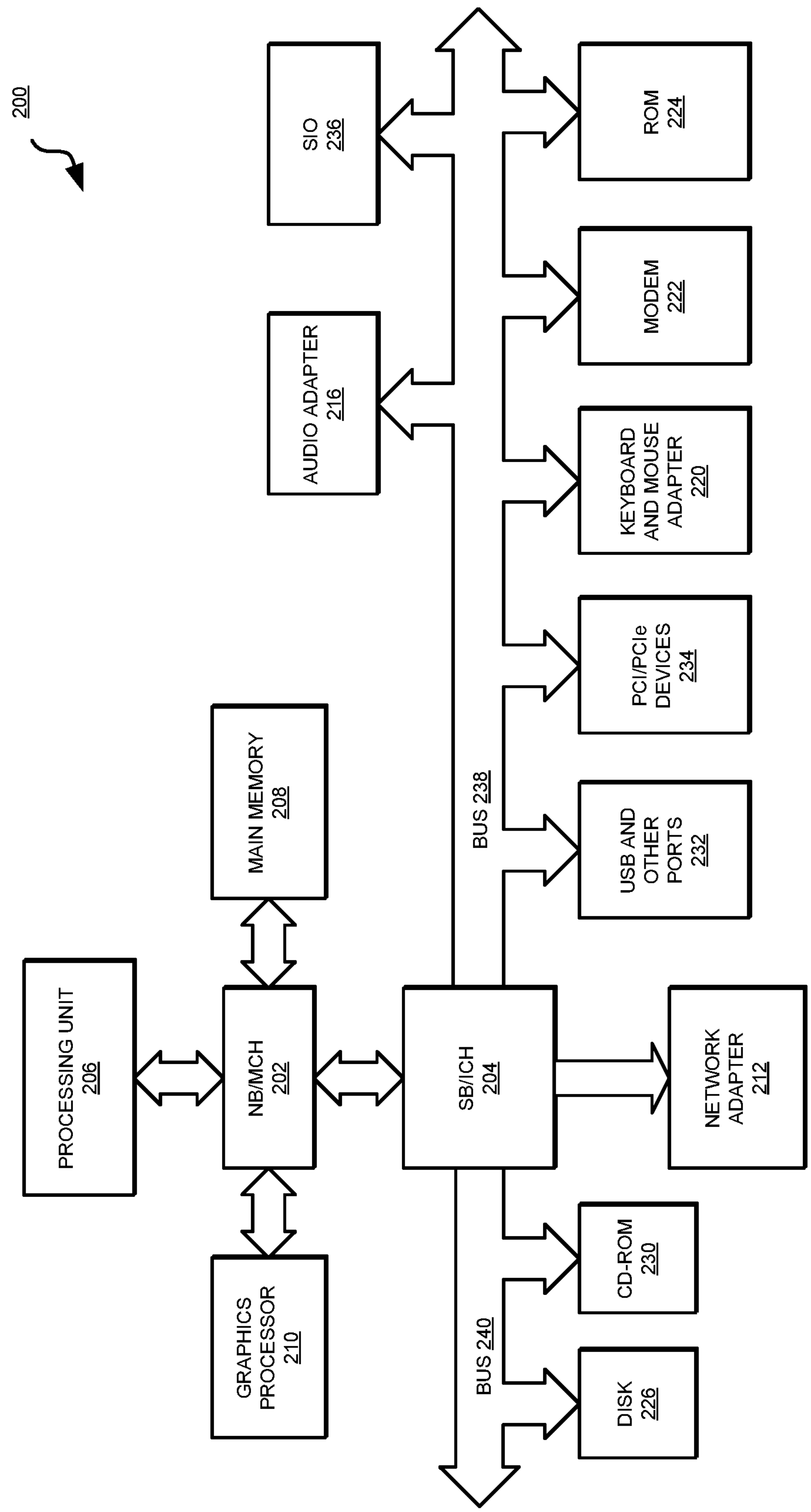
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Server 104 operates as a database server data processing system as described herein. Modified intercept agent 103 comprises a prior-art intercept agent or a similarly purposed application that includes one or more modifications to operate according to an embodiment described herein. Application 105 implements an embodiment described herein, and is configured to operate in conjunction with modified intercept agent 103. Security application 107 operates to perform security audits of database protocol packets, including performing database protocol analysis and security compliance verification. When supplied with an analyzed packet, security application 107 operates to perform security audits of the analyzed packets, including performing security compliance verification. Database 109 uses storage 108. Database 109 can be any type of database, including but not limited to a relational database, object oriented database, file or files of any suitable types, node graphs, forms of structured or unstructured data, or a combination thereof.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of other devices in which computer usable program code or instructions implementing the processes of the illustrative embodiments may be located. Data processing system 200 is described as a computer only as an example, without being limited thereto. Implementations in the form of other devices may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as intercept agent 103, application 105, and security application 107 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
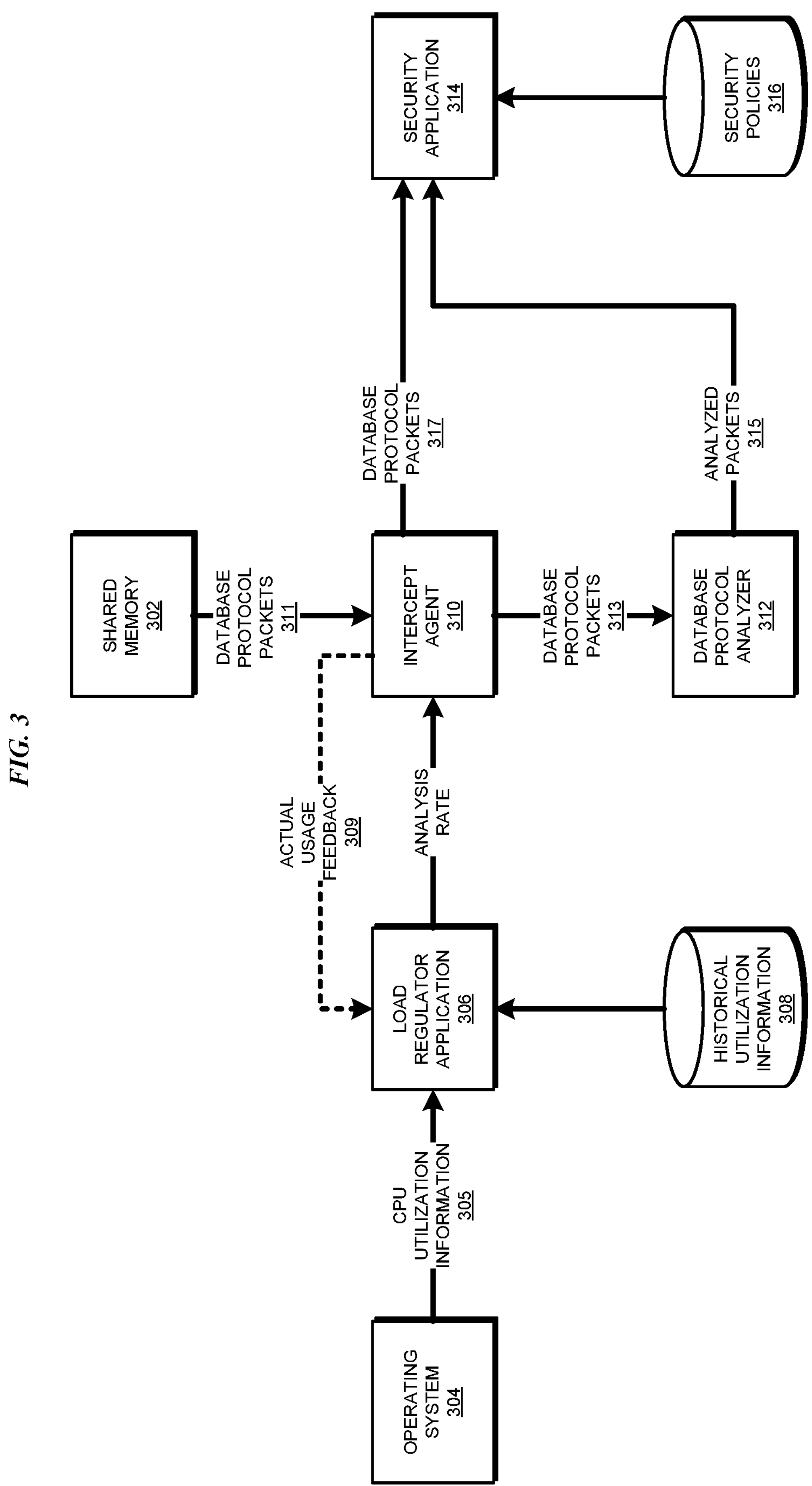
FIG. 3 depicts an example configuration for resource usage optimized auditing of database shared memory in accordance with an illustrative embodiment.

With reference to FIG. 3, this figure depicts an example configuration for resource usage optimized auditing of database shared memory in accordance with an illustrative embodiment. Shared memory 302 can be implemented using memory 208 in FIG. 2, or another memory (not shown) coupled to bus 238 in FIG. 2, and is usable for facilitating database transactions as described herein.

Operating system 304 can be any suitable operating system or a component thereof, such as the operating systems described with respect to FIG. 2. Operating system 304 is capable of providing utilization information 305 about one or more computing resources, e.g., the utilization information of one or more processors. Load regulator application 306 is an example of application 105 in FIG. 1. Application 306 receives utilization information 305 from operating system 304. Application 306 or another application maintains historical repository 308. Historical repository 308 comprises a historical record of utilization information 305 during past periods, and other information as described herein. For example, application 308 or intercept agent 310 can also maintain in historical repository 308 a historical record of actual processor capacity usage for essential functions by intercept agent 310. As another example, application 308 or intercept agent 310 can also maintain in historical repository 308 a historical record of actual processor capacity usage for performing protocol analysis of database protocol packets, as described herein.

Intercept agent 310 is an example of intercept agent 103 in FIG. 1. Application 306 provides analysis rate 307 to intercept agent 310. In some embodiments, intercept agent 310 provides feedback 309 to application 306. Feedback 309, when available, includes but is not limited to actual processor capacity usage for essential functions during various periods, actual processor capacity usage for performing protocol analysis of various database protocol packets, or a combination thereof. Application 306 computes analysis rate 307 using utilization information 305, information from historical repository 308, feedback 309, or some combination thereof, in the manner described in this disclosure.

Intercept agent 310 intercepts, detects, extracts, receives, or otherwise gains access to database protocol packets 311 that exist in shared memory 302 during any given period. Depending upon analysis rate 307 applicable for that period, intercept agent 310 selects, or application 306 causes intercept agent 310 to select, a fraction of database protocol packets 311 as selected database protocol packets 313.

Intercept agent 301 sends, or application 306 causes intercept agent 310 to send, selected database protocol packets 313 to database protocol analyzer 312 for protocol analysis, which forms the partial pre-analysis of the database protocol packets. Database protocol analyzer 312 generates analyzed packets 315 and sends analyzed packets 315 to security application 314 for security auditing.

Unselected database protocol packets 317 are the remaining database protocol packets from database protocol packets 311 that were not selected as database protocol packets 313. Intercept agent 310 sends, or application 306 causes intercept agent 310 to send, unselected database protocol packets 317 as-is to security application 314 for appropriate security audit processing.

Security application 314 performs the database protocol analysis, followed by security compliance verification, on database protocol packets 317. Security application 314 performs security compliance verification, on analyzed packets 315. Security application 314 uses one or more security policies, such as from policies repository 316 to perform the security compliance verification portion of the security audit.

Although application 306, intercept agent 310, and database protocol analyzer 312 are depicted separately, such depiction is not intended to be limiting on the illustrative embodiments. Modified intercept agent 310 is an example of modified intercept agent 103 in FIG. 1, and comprises a prior-art intercept agent that has been modified to perform a function according to an embodiment described herein.

For example, according to one embodiment, application 306 can be implemented within modified intercept agent 310 to accomplish the functions attributed to application 306 within such modified intercept agent 310. According to another embodiment, application 306 and database protocol analyzer 312 can both be implemented within modified intercept agent 310 to accomplish the respective functions attributed to application 306 and database protocol analyzer 312 within such modified intercept agent 310. Other combinations with these and other database components can be similarly formed without departing the scope of the illustrative embodiments.

Figure 4:
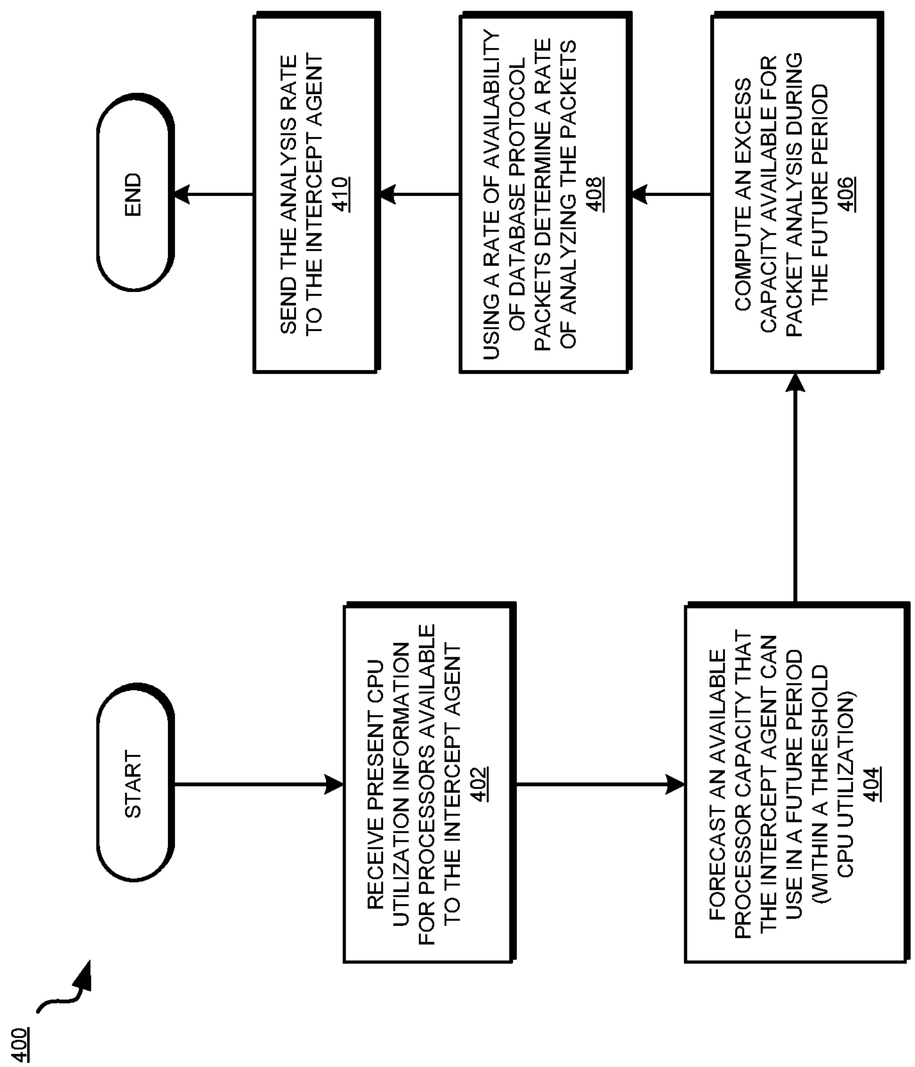
FIG. 4 depicts a flowchart of a portion of an example process for resource usage optimized auditing of database shared memory in accordance with an illustrative embodiment.

With reference to FIG. 4, this figure depicts a flowchart of a portion of an example process for resource usage optimized auditing of database shared memory in accordance with an illustrative embodiment. Process 400 can be implemented in application 306 in FIG. 3, or in a modified intercept agent 310 that accomplishes the functions attributed to application 306.

The application or the modified intercept agent receives present utilization information about a resource, e.g., the present utilization of one or more processors, that is available for use by an intercept agent or the modified intercept agent (block 402). Using processors and processor utilization only as examples, the application or the modified intercept agent forecasts an available processor capacity that the intercept agent or the modified intercept agent can use in a future period while obeying any threshold that may be applicable to such use (block 404).

The application or the modified intercept agent computes an excess capacity that is expected to be available to the intercept agent or the modified intercept agent, for packet analysis during the future period (block 406). For example, the application or the modified intercept agent removes from the forecast of block 404 such capacity as would be used for the essential functions of the intercept agent or the modified intercept agent, to arrive at the excess capacity of block 406.

Using an expected rate of availability of database protocol packets in a shared memory during the future period, the application or the modified intercept agent determines a rate of selecting database protocol packets for analysis (block 408). The rate of block 408 forms an analysis rate.

The application sends, or the modified intercept agent uses, the analysis rate for selecting database protocol packets for database protocol analysis (block 410). The application or the modified intercept agent end process 400 thereafter, or enter process 500 of FIG. 5.

With reference to FIG. 5, this figure depicts a flowchart of another portion of an example process for resource usage optimized auditing of database shared memory in accordance with an illustrative embodiment. Process 500 can be implemented in intercept agent 310 in FIG. 3, or in a modified intercept agent 310 as described elsewhere in this disclosure.

The intercept agent or the modified intercept agent receives or loads an analysis rate for a given period, such as the analysis rate computed in block 408 in FIG. 4 (block 502). During the period, the intercept agent or the modified intercept agent selects for database protocol analysis, a fraction of the database protocol packets received from a shared memory (block 504). The fraction corresponds to the analysis rate of block 502.

The intercept agent or the modified intercept agent performs or causes to be performed, the database protocol analysis on the selected database protocol packets (block 506). The database protocol analysis of a database protocol packet results in a corresponding analyzed packet.

The intercept agent or the modified intercept agent sends the analyzed packets corresponding to the selected database protocol packets for security auditing (block 508). The intercept agent or the modified intercept agent sends the unselected database protocol packets for security auditing (block 510). The intercept agent or the modified intercept agent ends process 500 thereafter.

Thus, a computer implemented method is provided in the illustrative embodiments for resource usage optimized auditing of database shared memory. Where an embodiment or a portion thereof is described with respect to a type of device, the computer implemented method is adapted or configured for use with a suitable and comparable manifestation of that type of device.

The embodiments are described with respect to a processor, processor capacity, future expected processor capacity, and other capacities related to a processor only as non-limiting examples. Many other computing resources, their respective utilizations, their respective capacities, their respective future available capacities are contemplated within the scope of the illustrative embodiments. For example, an embodiment can be configured to operate relative to a memory resource instead of or in addition to a processor resource in the manner described herein. Accordingly, such an embodiment uses memory capacity and future available memory capacity in a manner described herein within the scope of the illustrative embodiments. A networking device with bandwidth as a measure of capacity and future available capacity can similarly be used with an embodiment. An I/O device with throughput as a measure of capacity and future available capacity can similarly be used with an embodiment. Available time, cost of use, size of data or service, are some other factors that relate to capacities of a variety of other devices and are similarly usable as capacity and future available capacity within the scope of the illustrative embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for security auditing of database transactions, the method comprising:

forecasting, in a data processing system, for a specified period, an available capacity of a computing resource in the data processing system, the available capacity being usable to analyze a database protocol packet, wherein the database protocol packet is stored in a shared memory during a data communication;

determining a number of database protocol packets expected in the shared memory during the specified period;

determining a second number of database protocol packets that can be analyzed using the available capacity of the computing resource;

causing, during the specified period, the second number of database protocol packets to be selected from every number of database protocol packets stored in the shared memory, the selected database protocol packets being analyzed using the computing resource during the specified period;

performing the database protocol analysis on the selected database protocol packets to result in analyzed packets;

sending the analyzed packets to a security application executing using a second computing resource in a second data processing system; and sending unselected database protocol packets from the every number of database protocol packets to the security application, and wherein the security application performs a security audit on an analyzed packet using a first amount of the second computing resource in comparison to a second amount of the second resource.

2. The method of claim 1, wherein the first amount is less than the second amount.

3. The method of claim 1, further comprising:

using a historical record to determine the number of database protocol packets expected in the shared memory during the specified period, the historical record comprising an entry of an actual number of database protocol packets stored in the shared memory during a past period.

4. The method of claim 1, further comprising:

using a historical record to determine an expected amount of capacity of the computing resource consumed in analyzing a database protocol packet, the historical record comprising an entry of an actual amount of capacity of the computing resource consumed in analyzing the database protocol packet during a past period; and computing, as a part of determining the second number of database protocol packets, using the expected amount of capacity of the computing resource, the second number of database protocol packets that can be analyzed using the available capacity of the computing resource.

5. The method of claim 1, further comprising:

predicting a total available capacity of the computing resource during the specified period;

computing a usable capacity by applying a threshold to the total available capacity; and further reducing the usable capacity by a functioning amount to result in the available capacity.

6. The method of claim 5, wherein the threshold limits a usage of the computing resource by an intercept agent, and wherein the functioning amount correspond to a usage of the computing resource in performing a non-analytical function of the intercept agent.

7. The method of claim 1, further comprising:

using a historical record to forecast the available capacity of the computing resource during the specified period, the historical record comprising an entry of an actual utilized capacity of the computing resource during a past period.

8. The method of claim 1, wherein the computing resource comprises at least one hardware processor, wherein the available capacity comprises unutilized processor capacity of the at least one processor above an expected utilization of the at least one processor.

9. The method of claim 1, wherein the data communication uses the shared memory for performing a database transaction in the database transactions, the database transaction occurring between a database server executing using the data processing system and a database client executing using a second data processing system.

* * * * *